2,867,635

6-METHYL, 9α, 21-DIFLUORO, 11 OXYGENATED, 17α HYDROXY-4-PREGNENE-3,20 DIONE STEROID COMPOUNDS

Frank H. Lincoln, Jr., Kalamazoo, William P. Schneider, Kalamazoo Township, Kalamazoo County, and George B. Spero, Kalamazoo, Mich., assignors to The Upjohn Company, Kalamazoo, Mich., a corporation of Michigan No Drawing. Application March 6, 1957
Serial No. 644,200

4 Claims. (Cl. 260—397.45)

The present invention relates to steroid compounds and is concerned with 6-hydrocarbyl substituted steroid compounds particularly with 6-methyl-9α,21-difluoro-11β,17α,-dihydroxy-4-pregnene-3,20-dione, 6 - methyl - 9α,21 - difluoro-17α-hydroxy-4-pregnene-3,11,20-trione and a process for the production therefor.

This application is a continuation-in-part of copending applications Serial No. 608,663, filed September 10, 1956, and now abandoned, and Serial No. 623,763, filed November 23, 1956.

The new compounds and the process of the present invention are illustratively represented by the following sequence of formulae:

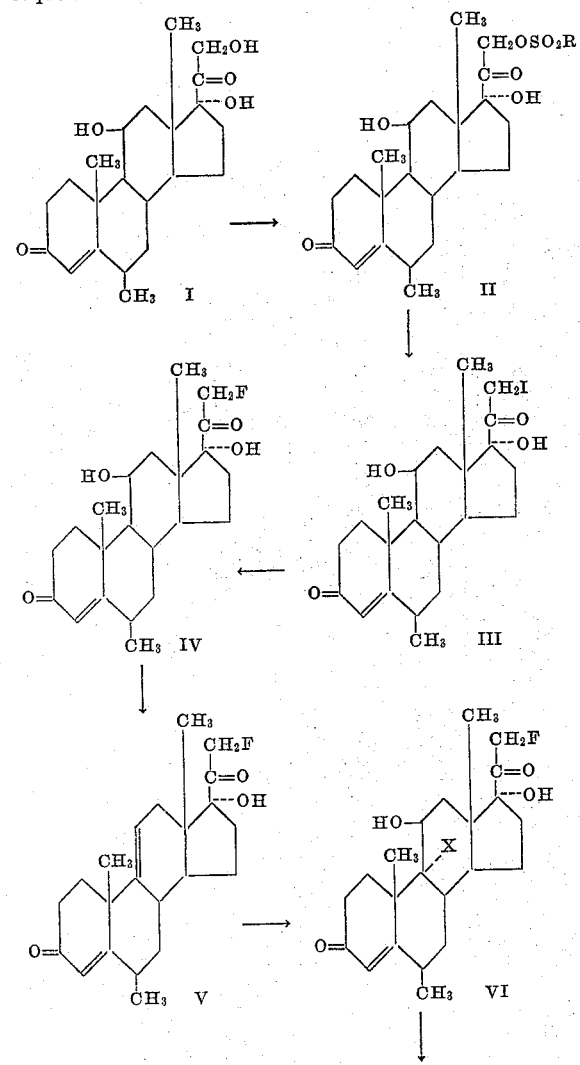

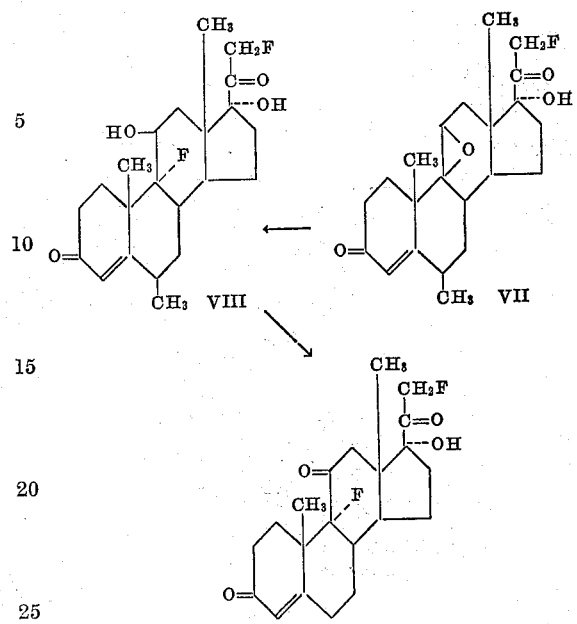

Alternatively, the new product VIII can be made by the following sequence of steps:

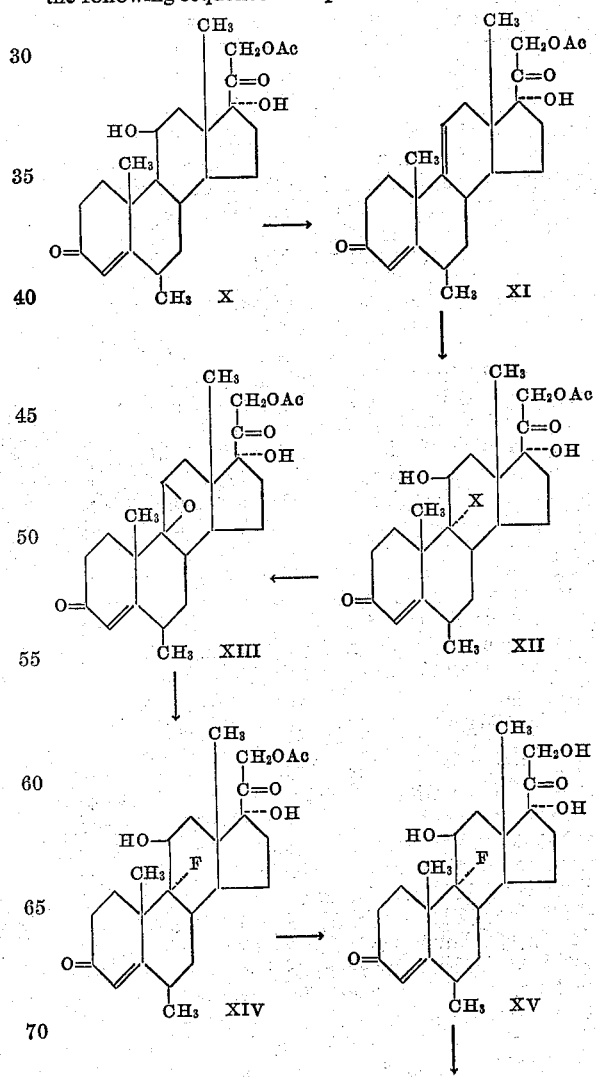

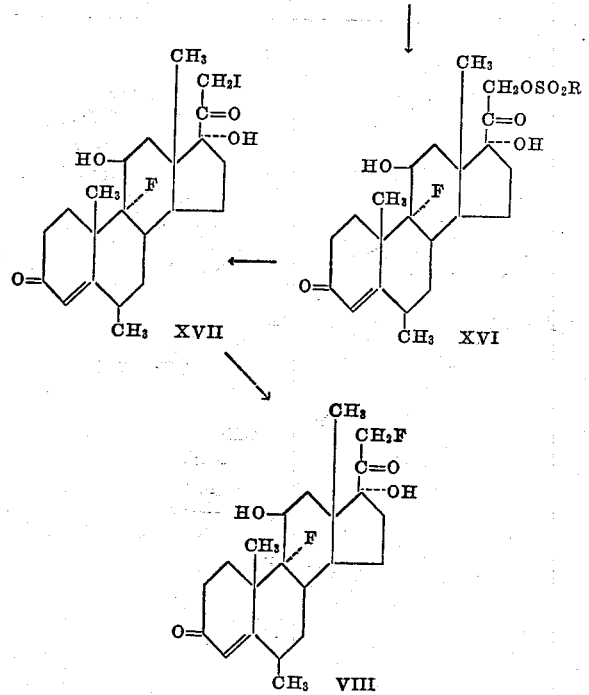

wherein X is a halogen of atomic number between 17 and 35, inclusive, R is an organic radical such as methyl, ethyl, phenyl, tolyl, naphthyl, or the like, with methyl preferred, and Ac is the acyl radical of an organic carboxylic acid, preferably a hydrocarbon carboxylic acid containing from one to eight carbon atoms, inclusive.

The process of the present invention represented by the sequence of Formulae I thru IX comprises: treating 6-methyl-11β,17α,21-trihydroxy-4-pregnene-3,20-dione [6-methylhydrocortisone (I)] with an organic sulfonyl halide such as methanesulfonyl chloride, toluenesulfonyl chloride, toluenesulfonyl bromide, benzenesulfonyl chloride, α- or β-naphthylsulfonyl chloride, or the like, to obtain the corresponding 21-ester, a 21-alkyl- or 21-arylsulfonate of 6-methyl-11β,17α,21-trihydroxy-4-pregnene-3,20-dione (II); treating the thus produced 21-alkyl- or arylsulfonate of 6-methyl-11β,17α,21-trihydroxy-4-pregnene-3,20-dione with an alkali metal iodide, such as sodium iodide in acetone solution to obtain 6-methyl-11β,17α-dihydroxy-21-iodo-4-pregnene-3,20-dione (III); treating the thus obtained 6-methyl-11β,17α-dihydroxy-21-iodo-4-pregnene-3,20-dione with silver fluoride, preferably in acetonitrile solution, to obtain 6-methyl-11β,17α-dihydroxy-21-fluoro-4-pregnene-3,20-dione (IV); alternatively 6-methyl-11β,17α,dihydroxy-21-fluoro-4-pregnene-3,20-dione is obtained by treating the sulfonate II with potassium fluoride as shown in Example 19; dehydrating the thus obtained 6-methyl-11β,17α-dihydroxy-21-fluoro-4-pregnene-3,20-dione, for example, with thionyl chloride or preferably with an acid N-haloamide or N-haloimide and then with anhydrous sulfur dioxide to obtain the corresponding 6-methyl-17α-hydroxy-21-fluoro-4,9(11)-pregnadiene-3,20-dione (V); treating the thus obtained 6-methyl-17α-hydroxy-21-fluoro-4,9(11)-pregnadiene-3,20-dione with a hypohalous acid such as hypochlorous or hypobromous acid preferably produced in situ by adding an N-haloacylamide or N-haloacylimide in the presence of an acid to obtain the corresponding 6-methyl-9α-halo-11β,17α-dihydroxy-21-fluoro-4-pregnene-3,20-dione (VI); treating the thus obtained 6-methyl-9α,halo-11β,17α-dihydroxy-21-fluoro-4-pregnene-3,20-dione with a mild base, for example, sodium or potassium acetate to obtain the corresponding 6-methyl-9β,11β-oxido-17α-hydroxy-21-fluoro-4-pregnene-3,20-dione (VII); treating the thus obtained oxido compound VII with hydrogen fluoride to obtain 6-methyl-9α,21-difluoro-11β,17α-dihydroxy-4-pregnene-3,20-dione (VIII), and if desired oxidizing the thus obtained 6-methyl-9α,21-difluoro-11β,17α-dihydroxy-4-pregnene-3,20-dione with chromic anhydride or a dichromate or other oxidizing agents to obtain 6-methyl-9α,21-di-fluoro-17α-hydroxy-4-pregnene-3,11,20-trione (IX).

In the alternative process the steps of fluorination are reversed so that first the 9α-fluoro group is introduced into the 6-methylhydrocortisone ester and thereupon the 21-hydroxyl group is replaced with fluorine. The process comprises the following steps: dehydrating a 6-methylhydrocortisone 21-acylate with thionyl chloride, or preferably an acid N-haloamide or N-haloimide and then with anhydrous sulfur dioxide to obtain 6-methyl-17α,21-dihydroxy-4,9(11)-pregnadiene-3,20-dione 21-acylate (XI); treating the thus produced 6-methyl-17α,21-dihydroxy-4,9(11)-pregnadiene-3,20-dione 21-acylate with a hypohalous acid such as hypochlorous or hypobromous acid, preferably by producing the hypohalous acid in situ, for example, in a mixture of N-haloacylamide or N-haloacylimide in the presence of acid, to obtain the corresponding 6-methyl-9α-halo-11β,17α,21-trihydroxy-4-pregnene-3,20-dione 21-acylate (XII). Treating the thus produced 6-methyl-9α-halo-11β,17α,21-trihydroxy-4-pregnene-3,20-dione 21-acylate with a base such as anhydrous potassium acetate or anhydrous sodium acetate yields the corresponding epoxy compound, 6-methyl-9β,11β-oxido-17α,21-dihydroxy-4-pregnene-3,20-dione 21-acylate (XIII); treating the thus obtained 6-methyl-9β,11β-oxido-17α,21-dihydroxy-4-pregnene-3,20-dione 21-acylate with hydrogen fluoride yields the corresponding 6-methyl-9α-fluoro-11β,17α,21-trihydroxy-4-pregnene-3,20-dione 21-acylate (XIV); hydrolyzing this ester in conventional manner with a base preferably in a nitrogen atmosphere yields the triol, 6-methyl-9α-fluorohydrocortisone (XV). Treating the thus obtained 6-methyl-9α-fluorohydrocortisone with an organic sulfonyl halide, such as methanesulfonyl chloride, toluenesulfonyl chloride, toluenesulfonyl bromide, benzenesulfonyl chloride, naphthylsulfonyl chloride, or the like, yields the corresponding 6-methyl-9α-fluorohydrocortisone 21-organic sulfonate (XVI); treating the thus obtained sulfonate of 6-methyl-9α-fluorohydrocortisone with sodium iodide in acetone solution yields 6-methyl-9α-fluoro-11β,17α-dihydroxy-21-iodo-4-pregnene-3,20-dione (XVII); and treating the thus obtained 21-iodo compound (XVII) with excess of silver fluoride, preferably in acetonitrile solution yields 6-methyl-9α,21-difluoro-11β,17α-dihydroxy-4-pregnene-3,20-dione (VIII). Alternatively, treating sulfonate XVI with potassium fluoride as shown in Example 19 produces 6-methyl-9α,21-difluoro-11β,17α-dihydroxy-4-pregnene-3,20-dione (VIII).

It is an object of the instant invention to provide novel 6-methyl-9α,21-difluoro-11β,17α-dihydroxy-4-pregnene-3,20-dione and the keto analogue thereof, 6-methyl-9α,21-difluoro-17α-hydroxy-4-pregnene-3,11,20-trione. It is another object of the instant invention to provide methods for the production of 6-methyl-9α,21-difluoro-11β,17α-dihydroxy-4-pregnene-3,20-dione and 6-methyl-9α,21-difluoro-17α-hydroxy-4-pregnene-3,11,20-trione. Other objects of this invention will be apparent to those skilled in the art to which this invention pertains.

The novel compounds of the present invention, 6-methyl-9α,21-difluoro-11β,17α-dihydroxy-4-pregnene-3,20-dione and 6-methyl-9α,21-difluoro-17α-hydroxy-4-pregnene-3,11,20-trione, possess a high order of physiological activity and especially a high order of glucocorticoid activity which is several times that of hydrocortisone or cortisone. In addition they are not salt retaining but have distinct diuretic qualities. The novel synthetic corticosteroid hormones, 6α-methyl-9α,21-difluoro-11β,17α-dihydroxy-4-pregnene-3,20-dione and 6α-methyl-9α,21-difluoro-17α-hydroxy-4-pregnene-3,11,20-trione, possess also strong anti-inflammatory activity and are thus useful in the management of arthritis, especially in cases where in addition to chronic congestive heart failure, neophrotic syndromes and other circulatory symptoms are present. The compounds may be given as oral compositions and tablets, illustratively, using either polyethylene glycol 4000 or 6000 as a carrier, or lactose and/or sucrose as diluent. Especially useful is the novel 6α-methyl-9α,21- difluoro - 11β,17α - dihydroxy - 4 - pregnene-3,20-dione which can also be used in topical applications such as ointments, lotions, jellies, creams, suppositories, bougies, aqueous suspension etc. Examples of advantageous topical preparations are given below. While the examples below are to the 6α-methyl-9α,21-difluoro-11β,17α-dihydroxy-4-pregnene-3,20-dione, equivalent amounts of 6α-methyl-9α,21-difluoro-17α-hydroxy-4-pregnene-3,11,20-trione, the 6β-epimers and other 6-lower-alkyl and 6-phenyl homologues of the compounds of this invention are substitutable therein.

A dermatological and ophthalmic ointment has the following composition:

| | Pounds |
|---|---|
| Wool fat, U. S. P | 100 |
| Mineral oil, U. S. P | 125 |
| 6α-methyl-9α,21-difluoro-11β,17α-dihydroxy-4 - pregnene-3,20-dione (micronized) | 2 |
| White petrolatum, U. S. P | 500 |

Incorporation of an antibiotic in the ointment, especially neomycin sulfate, has therapeutic advantages, each active ingredient potentiating and supplementing the useful properties of the other. Such an ointment is as follows:

| | Pounds |
|---|---|
| Wool fat, U. S. P | 100 |
| Mineral oil, U. S. P | 125 |
| Neomycin sulfate | 3 |
| 6α-methyl-9α,21-difluoro-11β,17α-dihydroxy-4 - pregnene-3,20-dione (micronized) | 0.7 |
| White petrolatum, U. S. P | 500 |

In place of, or in addition to, neomycin sulfate, other antibiotics such as bacitracin, circulin, polymyxin B sulfate, gramicidin, streptomycin sulfate, dihydrostreptomycin sulfate, oxytetracycline, chlorotetracycline, tetracycline, chloramphenicol and the sulfonamides can be used in conjunction with the steroids of the present invention for preparations such as the above ointments.

In carrying out the process of the instant invention the selected 6-alkyl- or 6-arylhydrocortisone (6-alkyl- or 6-aryl-11β,17α,21-trihydroxy-4-pregnene-3,20-dione) (I) is treated with an acid halide of a sulfonic acid such as methanesulfonic acid, ethanesulfonic acid, propanesulfonic acid, benzenesulfonic acid, p-toluenesulfonic acid, α- or β-naphthanesulfonic acid, or the like with methanesulfonic acid halides especially methanesulfonyl chloride preferred. In the preferred embodiment of the instant invention the steroid is reacted with the alkyl- or arylsulfonyl halide in solution such as in a solvent, for example, pyridine, benzene, toluene, or the like, at a temperature between minus ten and plus thirty degrees centigrade providing that at the lower temperature the solvent has not solidified. Pyridine is the preferred solvent and a temperature between minus ten and plus ten degrees centigrade is preferred. The time of reaction is usually between thirty minutes and six or eight hours after which the product, 6-alkyl- or 6-aryl-11β,17α,21-trihydroxy-4-pregnene-3,20-dione 21-alkyl- or arylsulfonate is removed in conventional manner, for example, by evaporating the solvent until a dry residue is precipitated or by extracting the material from an aqueous solution. For extraction, solvents such as methylene chloride, chloroform, carbon tetrachloride, benzene, ether, toluene, or the like can be used. Removing the extraction solvent by distillation leaves the crude 6-alkyl- or 6-aryl- 11β,17α,21-trihydroxy-4-pregnene-3,20 - dione 21-alkyl- or arylsulfonate (II).

For the purpose of producing the final product, it is unnecessary to purify the thus obtained 21-alkyl- or 21-arylsulfonate and the crude steroid sulfonate ester can be used for the production of 6-alkyl- or 6-aryl-11β,17α-dihydroxy-21-iodo-4-pregnene-3,20-dione.

The 21-iodo compound is prepared by reacting the 21-alkyl- or arylsulfonate of 6-alkyl or 6-aryl-11β,17α,-21-trihydroxy-4-pregnene-3,20-dione with sodium or potassium iodide in a dialkyl ketone solution such as acetone solution. A molar excess of sodium iodide (three to twenty moles of sodium iodide per mole of steroid) is generally preferred for this reaction; and the reaction mixture containing 6-alkyl- or 6-aryl-11β,17α,21-trihydroxy-4-pregnene-3,20-dione 21-alkyl- or arylsulfonate and the sodium iodide in acetone is heated to reflux for a period of three or four minutes to half an hour. The thus produced 6-alkyl- or 6-aryl-11β,17α-dihydroxy-21-iodo-4-pregnene-3,20-dione is isolated by evaporating the solvent. For the subsequent reaction it is unnecessary to carefully purify the thus obtained 6-alkyl- or 6-aryl-11β,17α-dihydroxy-21-iodo-4-pregnene-3,20-dione (III).

In order to obtain 6-methyl-11β,17α-dihydroxy-21-fluoro-4-pregnene-3,20-dione, the crude 6-alkyl- or 6-aryl-11β,17α-dihydroxy-21-iodo-4-pregnene - 3,20 - dione, dissolved in a suitable solvent such as acetonitrile, hexanes, heptanes, benzene, tertiary butyl alcohol, or the like with acetonitrile preferred, is reacted with silver fluoride. The reaction is usually carried out under exclusion of light and with stirring. The preferred form of silver fluoride used is a fifty percent aqueous silver fluoride solution rather than solid silver fluoride. The reaction is generally carried out between forty to sixty degrees centigrade; however, lower or higher temperatures between ten and about 75 degrees centigrade are operative. Since the silver iodide produced in the reaction forms a molecular compound with silver fluoride, two moles of silver fluoride must be used per mole of steroid as the minimum amount necessary for theoretical recovery. However, it is preferred to use an even greater amount, between ten to fifty percent over and above the calculated amount, in order to obtain higher yields. The silver fluoride is generally added in portions over a period of time, the reaction time ranging usually from one half to six hours. In order to isolate the product, the solvent is evaporated and the crude product 6-alkyl- or 6-aryl-11β,17α-dihydroxy-21-fluoro-4-pregnene-3,20-dione (IV) extracted with a suitable solvent such as chloroform, methylene chloride, carbon tetrachloride, benzene, or the like. Purification is made by conventional procedures such as additional extraction to eliminate impurities, recrystallization or chromatography, as deemed necessary.

The thus obtained 6-alkyl- or 6-aryl-11β,17α-dihydroxy-21-fluoro-4-pregnene-3,20-dione is dehydrated to the corresponding 6-alkyl- or 6-aryl-21-fluoro-17α-hydroxy-4,9(11)-pregnadiene-3,20-dione by methods known in the art, for example, by dehydrating agents such as phosphorus oxychloride, hydrochloric acid or sulfuric acid and acetic acid, thionyl chloride, by pyrolysis as shown by U. S. Patents 2,640,838 and 2,640,839, and the like. In the preferred embodiment of the present invention the dehydration is effected by reacting the 11β-hydroxy compound with an acid N-haloamide or N-haloimide in an organic base and treating the thus produced intermediate 11-hypohalite with dry sulfur dioxide in an organic base. As reagents for the production of an 11-hypohalite, the acid N-haloamide or N-haloimide are used wherein the halogen has an atomic number from 17 to 53, inclusive, preferably chlorine or bromine. Examples of such compounds are N-chloroacetamide, N-bromoacetamide, N-chlorosuccinimide, N-bromosuccinimide, N-iodosuccinimide, 3-bromo-5,5- dimethyl hydantoin. Ordinarily an amount in excess of a molar equivalent, calculated on the starting 11β-hydroxy steroid, is employed. The base employed in the production of the 11-hypohalite are tertiary amines wherein the amino nitrogen is a member of an aromatic ring, for example, the pyridines, that is, pyridine, alkylpyridines, piccoline, lutidine, collidine, conyrine, parvuline, or the like, or lower fatty amides such as formamide, methylformamide and dimethylformamide. The base is preferably employed in a large molar excess, calculated on the starting 11β-hydroxy steroid, for example, ten molar equivalents, and is preferably the sole reaction solvent. The reaction to produce an 11-hypohalite is generally conducted under anhydrous conditions preferably containing less than 0.1 molar equivalent of water calculated per mole of steroid. Large proportions of water decrease the yield. The temperature of the reaction is between minus forty and plus seventy degrees centigrade, the lower limit being determined by the solubility of the reaction and by the character of the solvents, and the upper limit being determined by the amount of side reaction which normally accompanies the reaction involving any halo compounds at higher temperatures. Ordinarily, room temperature (twenty to thirty degrees centigrade) is preferred for convenience and because of the consistently high yields of the desired product which are obtained at this temperature. A reaction period between five minutes to three hours is unually employed, at higher temperatures—above thirty degrees centigrade—short reaction times are sufficient to produce completeness of the reaction.

The thus produced 6-alkyl- or 6-aryl-11β,17α-dihydroxy-21-fluoro-4-pregnene-3,20-dione 11β-hypohalite is then treated with anhydrous sulfur dioxide in the presence of an organic base as described hereinbefore. The anhydrous sulfur dioxide can be in the form of gaseous or liquid sulfur dioxide or in the form of a material which in situ produces sulfur dioxide, for example, alkali metal hyposulfite. The reaction temperature ranges substantially within minus forty and plus seventy degrees centigrade and is preferably room temperature (about twenty to thirty degrees centigrade). The thus obtained product, 6-alkyl- or 6-aryl-17α-hydroxy-21-fluoro-4,9(11)-pregnadiene-3,20-dione, is isolated from the reaction mixture by conventional means such as extraction after the reaction mixture has been poured into excess of water. Organic water-immiscible solvents such as ether, chloroform, methylene chloride, carbon tetrachloride, ethyl acetate, benzene, hexanes, or the like, are used for the extraction. The thus obtained extracts are conveniently washed, dried and thereupon evaporated to give the crude 6-alkyl- or 6-aryl-17α-hydroxy-21-fluoro-4,9(11)-pregnadiene-3,20-dione (V) which is purified by conventional means such as recrystallization or chromatography, as deemed necessary.

The thus produced 6-alkyl- or 6-aryl-17α-hydroxy-21-fluoro-4,9(11)-pregnadiene-3,20-dione is converted to 6-alkyl- or 6-aryl-9α-halo-11β,17α-dihydroxy-21-fluoro-4-pregnene-3,20-dione by adding a hypohalous acid such as hypochlorous or hypobromous acid. The hypohalous acid is usually added by reacting an N-haloacidamide or an N-haloacidimide with an acid to produce the hypohalous acid in situ. In the preferred embodiment of the invention, the steroid, a 6-alkyl- or 6-aryl-17α-hydroxy-21-fluoro-4,9(11)-pregnadiene-3,20-dione is dissolved in an organic solvent such as methylene chloride, tertiary butyl alcohol, dioxane, tertiary amyl alcohol, or the like, and reacted at room temperature with the hypobromous or hypochlorous acid releasing agent in the presence of an acid. Such hypohalous acid releasing agent includes the N-bromoacetamide, the N-chloracetamide, the N-bromosuccinimide, or the like, in the presence of water and an acid such as perchloric acid, dilute sulfuric acid, or the like. The reaction is usually carried out at room temperature, between fifteen to thirty degrees centigrade; however, lower or higher temperatures are operative for the process. The hypohalous acid releasing agent is generally used in one molar or slightly increased, for example, 25 percent increased amounts compared to mole of steroid. A large excess of the hypohalous acid releasing agent, while operative, is undesirable since the excess of hypohalous acid has a tendency to react on other positions of the molecule. The reaction period is rather short and may vary between about four to five minutes to one hour. At the end of the reaction time excess of hypohalous acid is destroyed by the addition of sodium sulfite or other sulfites or hydrosulfites. The thus produced product, a 6-alkyl- or 6-aryl-9α-halo-11β,17α-dihydroxy-21-fluoro-4-pregnene-3,20-dione (VI), wherein the halogen atom is of atomic weight between 33 and 130 (atomic number 17 to 35), is isolated from the reaction mixture by adding excess of water and extracting the compound with organic solvents or by recovering the precipitated compounds through filtration. The crude product thus obtained may be recrystallized from organic solvents, such as acetone, Skellysolve B hexane hydrocarbons or the like to give pure 6-alkyl- or 6-aryl-9α-halo-11β,17α-dihydroxy-21-fluoro-4-pregnene-3,20-dione.

Oxidizing the 6-alkyl- or 6-aryl-9α-halo-11β,17α-dihydroxy-21-fluoro-4-pregnene-3,20-dione with chromic acid produces the corresponding pharmaceutically active 6-alkyl- or 6-aryl-9α-halo-17α-hydroxy-21-fluoro-4-pregnene-3,11,20-trione.

In order to obtain the 9α-fluoro compounds, the 9β,11β-epoxy intermediates of the before-mentioned compounds, 6-alkyl- or 6-aryl-9β,11β-oxido-17α-hydroxy-21-fluoro-4-pregnene-3,20-dione are prepared. In carrying out this reaction a 6-alkyl- or 6-aryl-9α-halo-11β,17α-dihydroxy-21-fluoro-4-pregnene-3,20-dione is heated in solution with a mild base, and preferably in the absence of water to avoid hydrolysis of the ester groups. The bases useful for the cyclization include anhydrous potassium acetate, sodium bicarbonate, sodium acetate, or the like, with potassium acetate preferred. Solvents such as methanol, ethanol, acetone, tertiary butyl alcohol, or the like, can be used. The reaction time is between one half hour and 24 hours; generally a period between three and twelve hours is sufficient. The thus obtained 6-alkyl- or 6-aryl-9β,11β-oxido-17α-hydroxy-21-fluoro-4-pregnene-3,20-dione is isolated from the reaction mixture by diluting the reaction mixture with excess water and filtering the product when crystalline, or by extracting with methylene chloride or other water-immiscible solvents such as ether, Skellysolve B hexanes, pentanes, benzene, ethyl acetate, chloroform, carbon tetrachloride, or the like. Evaporation of the solvent of the extracts produces the 6-alkyl- or 6-aryl-9β,11β-oxido-17α-hydroxy-21-fluoro-4-pregnene-3,20-dione (VII).

The thus obtained 6-alkyl- or 6-aryl-9β,11β-oxido-17α-hydroxy-21-fluoro-4-pregnene-3,20-dione is thereupon reacted with hydrofluoric acid in solution. As solvents for this reaction methylene chloride, tetrahydrofuran, ethylene dichloride, chloroform, carbon tetrachloride, and mixtures thereof or the like are useful, with methylene chloride and tetrahydrofuran preferred. With methylene chloride at room temperature, aqueous 48 percent hydrofluoric acid is generally used, while with tetrahydrofuran at low temperatures liquid hydrogen fluoride is used. The reaction is carried out preferably with stirring at room temperature (twenty to thirty degrees centigrade) when methylene chloride is used as solvent and at low temperatures, zero to minus eighty degrees centigrade when tetrahydrofuran is used in the presence of chlorinated hydrocarbons. The period of reaction is from one to 24 hours with a period from one to twelve hours usually sufficient. After the reaction is terminated, the mixture is poured into water and neutralized with a dilute base such as sodium bicarbonate, potassium bicarbonate, or the like. Excess of strong bases can also be used. The reaction mixture is then extracted with a water-immiscible solvent such as methylene chloride, the organic layer is separated from the water mixture, washed with water, dried and evaporated to give the crude 6-alkyl- or 6-aryl-9α,21-difluoro - 11β,17α - dihydroxy - 4 - pregnene - 3,20-dione (VIII). The thus obtained crude compound can be purified through recrystallization or chromatography.

Oxidation of 6 - alkyl- or 6 - aryl - 9α,21-difluoro-11β, 17α - dihydroxy - 4 - pregnene - 3,20 - dione in conventional manner, for example, with chromic anhydride or an alkali chromate, in solution such as in acetic acid, at temperatures between zero and forty degrees, provides the corresponding 6-alkyl- or 6-aryl-9α,21-difluoro-17α-hydroxy-4-pregnene-3,11,20-trione.

In the alternative procedure shown as Steps X to XVII to Compound VIII, the reactions involved are the same as those described before in the steps from Compound I to VIII, except that the introduction of the 9α-fluoro atom is made first, before the introduction of the 21-fluoro atom. As starting material in this second procedure instead of the 6-methylhydrocortisone, an ester thereof is used such as an acetate, propionate, butyrate, pentanoate, hexanoate, benzoate, phenylacetate, or the like, of 6-methylhydrocortisone. These esters (Formula X), prepared by the usual methods of esterification such as reacting 6-methylhydrocortisone with an acid chloride, an acid bromide or an acid anhydride of a hydrocarbon carboxylic acid in pyridine, are dehydrated in the same manner as shown for compound I to give 6-methyl-17α-hydroxy-21-acyloxy-4, 9(11)-pregnadiene-3,20-dione (IX). This compound (XI) is submitted to the same steps as shown in the sequence V through VIII before, to give 6-methyl-9α-fluoro-11β,17α,21 - trihydroxy - 4 - pregnene - 3,20 - dione 21-acylate (XIV) which is submitted to hydrolysis in known manner, that is with a base preferably in a nitrogen atmosphere to give the free triol, 6-methyl-9α-fluoro-11β, 17α,21 - trihydroxy - 4 - pregnene - 3,20 - dione (XV).

Compound XV, 6 - methyl - 9α - fluoro - 11β,17α,21-trihydroxy-4-pregnene-3,20-dione, is then subjected to the same treatment as Compound I in the sequence I–IV, i. e., esterification with an aryl- or alkylsulfonate to give XVI, treating the thus obtained 21-aryl- or alkylsulfonate of 6 - methyl - 9α - fluoro - 11β,17α,21 - trihydroxy - 4 - pregnene-3,20-dione (XVI) with sodium iodide in acetone solution to give XVII and thereupon the thus-obtained 21-iodo compound XVII with silver fluoride to give the product of the first procedure, i. e., 6-methyl-9α,21-difluoro-11β,17α - dihydroxy - 4 - pregnene - 3,20 - dione (VIII). Alternatively, as shown in Example 19, compound VIII can be obtained by treating the sulfonate XVI with potassium fluoride.

The following examples are illustrative for the processes and products of the present invention, but are not to be construed as limiting.

Example 1

6α - methyl - 11β,17α,21 - trihydroxy - 4 - pregnene-3,20-dione 21 - methanesulfonate (6 - methylhydrocortisone 21-methanesulfonate)

A solution was prepared containing one gram (2.65 millimoles) of 6α-methylhydrocortisone in seven milliliters of pyridine. This solution was cooled to zero degrees centigrade and treated with 0.3 milliliter of methanesulfonyl chloride. Thereafter the solution was allowed to stand at zero to five degrees centigrade for a period of two hours, after which it was diluted with water and extracted with three 25-milliliter portions of methylene chloride. The extracts were combined, washed with cold dilute hydrochloric acid until a pH of two to three was maintained in the aqueous layer, then washed again with cold sodium bicarbonate solution, water and finally dried over anhydrous sodium sulfate. Evaporation of the methylene chloride extract at reduced pressure gave a white glassy product of 6α-methyl-11β,17α,21-trihydroxy-4-pregnene-3,20-dione 21-methanesulfonate.

Example 2

6α-methyl-11β,17α-dihydroxy-21-iodo-4-pregnene-3,20-dione

The crude 6α-methyl-11β,17α,21-trihydroxy-4-pregnene-3,20-dione 21-methanesulfonate of Example 1 was dissolved in fifteen milliliters of acetone and treated with a solution of one gram of sodium iodide in ten milliliters of acetone. The mixture was heated under reflux with stirring for a period of fifteen minutes, the heat then reduced and the mixture concentrated to one-third volume at reduced pressure. Ice and water were added and the precipitated product collected on a filter, washed with water and dried to yield 1.1 grams of 6α-methyl-11β,17α-dihydroxy-21-iodo-4-pregnene-3,20-dione of melting point 135 to 140 degrees centigrade with decomposition.

*Analysis.*—Calcd. for $C_{22}H_{31}O_4I$: I, 26.09. Found: I, 25.05.

Example 3

6α-methyl-11β,17α-dihydroxy-21-fluoro-4-pregnene-3,20-dione

A solution of one gram of 6α-methyl-11β,17α-dihydroxy-21-iodo-4-pregnene-3,20-dione in 150 milliliters of acetonitrile (practical grade) was prepared by heating to the boiling point. After cooling to forty degrees centigrade, the solution was protected from light and 0.8 milliliter of fifty percent aqueous solution of silver fluoride was added under stirring. Stirring was continued for one hour at about forty degrees centigrade, then 0.7 milliliter of silver fluoride solution was added and after another hour of stirring another 0.7 milliliter portion of aqueous silver fluoride solution was added. Heating and stirring was then continued for a period of two hours. The brown mixture was thereupon filtered through a bed of Celite diatomaceous earth and the filtrate evaporated at reduced pressure from a bath at a temperature of fifty degrees centigrade. The brown residue was thoroughly extracted with two one-hundred-milliliter portions of warm methylene chloride, the combined extracts washed with water, dried over anhydrous sodium sulfate and concentrated to approximately 100-milliliter volumes and chromatographed over fifty grams of Florisil synthetic magnesium silicate. Fractions of 200 milliliters were taken as follows:

TABLE I

| Fractions | Solvent |
|---|---|
| 1–9 | Hexane-acetone, 90:10. |
| 10–12 | Hexane-acetone, 85:15. |
| 13 | Acetone, 100 percent. |

The hexane mixture used was Skellysolve B hexanes. Fractions 5 to 8, inclusive, were combined and evaporated to give 283 milligrams of crystals which after recrystallization from acetone-Skellysolve B (yielded 260 milligrams) of 6α-methyl-11β,17α-dihydroxy-21-fluoro-4-pregnene-3,20-dione of 220 to 223 degrees centigrade.

*Analysis.*—Calcd. for $C_{22}H_{31}O_4F$: C, 69.81; H, 8.26; F, 5.02. Found: C, 70.14; H, 7.95; F, 5.60.

Infrared spectrum in Nujol mineral oil suspension:

| | Cm.$^{-1}$ |
|---|---|
| Hydroxy | 3440 |
| 20-keto | 1724 |
| 3-keto | 1645 |
| Δ$^4$-double bond | 1608 |

Example 4

6α-methyl-17α-hydroxy-21-fluoro-4-pregnene-3,11,20-trione

A mixture was prepared containing 0.5 gram of 6α-methyl - 11β,17α - dihydroxy - 21 - fluoro - 4 - pregnene - 3,20-dione, 0.15 gram of chromic acid, ten milliliters of glacial acetic acid and one-half milliliter of water. This mixture was stirred and thereupon maintained for eight hours at room temperature. Thereafter the mixture was poured into fifty milliliters of ice water, neutralized by the addition of dilute sodium hydroxide and the thus obtained precipitate collected on a filter and recrystallized three times from ethyl acetate and Skellysolve B hexanes to give 6α-methyl-17α-hydroxy-21-fluoro-4-pregnene-3,11,20-trione.

In the same manner shown in Example 1, treating other 6α-alkylhydrocortisones with the chlorides or bromides of toluenesulfonic acid, methanesulfonic acid and other organic sulfonic acids, gives the corresponding 21-toluene-sulfonate or, respectively, the 21-methanesulfonate, or the like, of the corresponding 6α-alkylhydrocortisones wherein the alkyl group may be methyl, ethyl, propyl, isopropyl, butyl, isobutyl, pentyl, hexyl, or an aryl such as phenyl, or the like.

Treating the thus obtained 21-toluenesulfonate, 21-methanesulfonate or other 21-alkyl- or 21-arylsulfonates of 6α-alkylhydrocortisone with sodium or potassium iodide in acetone at elevated temperature, usually reflux temperature, yields the corresponding 21-iodo compound such as, for example, 6α-ethyl-11β,17α-dihydroxy-21-iodo-4-pregnene-3,20-dione, 6α-propyl-11β,17α-dihydroxy-21-iodo-4-pregnene-3,20-dione, 6α-isopropyl-11β,17α-dihydroxy-21-iodo-4-pregnene-3,20-dione, 6α-butyl-11β,17α-dihydroxy-21-iodo-4-pregnene-3,20-dione, 6α-isobutyl-11β,17α-dihydroxy-21-iodo-4-pregnene-3,20-dione, 6α-pentyl-11β,17α-dihydroxy-21-iodo-4-pregnene-3,20-dione, 6α-hexyl-11β,17α-dihydroxy-21-iodo-4-pregnene-3,20-dione, 6α-phenyl-11β,17α-dihydroxy-21-iodo-4-pregnene-3,20-dione, and the like.

Treating as shown in Example 3 at reflux temperature the thus prepared 21-iodo compounds in acetonitrile with aqueous silver fluoride yields the corresponding 21-fluoro compound such as: 6α-ethyl-11β,17α-dihydroxy-21-fluoro-4-pregnene-3,20-dione, 6α-propyl-11β,17α-dihydroxy-21-fluoro-4-pregnene-3,20-dione, 6α-isopropyl-11β,17α-dihydroxy-21-fluoro-4-pregnene-3,20-dione, 6α-butyl-11β,17α-dihydroxy-21-fluoro-4-pregnene-3,20-dione, 6α-isobutyl-11β,17α-dihydroxy-21-fluoro-4-pregnene-3,20-dione, 6α-pentyl-11β,17α-dihydroxy-21-fluoro-4-pregnene-3,20-dione, 6α-hexyl-11β,17α-dihydroxy-21-fluoro-4-pregnene-3,20-dione, 6α-phenyl-11β,17α-dihydroxy-21-fluoro-4-pregnene-3,20-dione, and the like.

Instead of the 6α-methylhydrocortisone the 6β-epimers can be used in the above examples and if the conditions are kept near neutral, the 6β-epimers, such as 6β-methyl-11β,17α-dihydroxy-21-fluoro-4-pregnene-3,20-dione can be isolated from the reaction mixture. The thus obtained 6β-epimers yield the 6α-epimers by treatment with acid or base in an organic solvent, e. g., ethanol at room temperature.

Example 5

6α - methyl - 17α - hydroxy - 21 - fluoro - 4,9(11)-pregnadiene-3,20-dione

A mixture of one gram of 6α-methyl-11β,17α-dihydroxy-21-fluoro-4-pregnene-3,20-dione, 650 milligrams of N-bromoacetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.7 gram of 6α-methyl-17α-hydroxy-21-fluoro-4,9(11)-pregnadiene-3,20-dione.

Example 6

6α - methyl - 9α - bromo - 11β,17α - dihydroxy - 21-fluoro-4-pregnene-3,20-dione A solution was prepared containing 0.5 gram of 6α-methyl - 17α - hydroxy - 21 - fluoro-4,9(11)-pregnadiene-3,20-dione in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice-water. The white crystalline precipitate was filtered, washed with water and then dried and recrystallized from a mixture of acetone and Skellysolve B hexane hydrocarbons to give 6α-methyl-9α-bromo - 11β,17α - dihydroxy - 21-fluoro-4-pregnene-3,20-dione.

Example 7

6α - methyl - 9(11) - oxido - 17α - hydroxy - 21 - fluoro-4-pregnene-3,20-dione

A mixture of 0.45 gram of 6α-methyl-9α-bromo-11β,17α - dihydroxy - 21 - fluoro - 4 - pregnene - 3,20 - dione, 0.45 gram of anhydrous potassium acetate and twenty milliliters of acetone was heated at its refluxing temperature for a period of five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B plus ten percent acetone eluate contained 6α - methyl - 9(11) - oxido-17α-hydroxy - 21 - fluoro - 4 - pregnene - 3,20 - dione.

Example 8

6α - methyl - 9α,21 - difluoro - 11β,17α - dihydroxy - 4-pregnene-3,20-dione

A solution of one gram of 6α-methyl-9(11)-oxido-17α-hydroxy-21-fluoro-4-pregnene-3,20-dione was dissolved in fifty milliliters of methylene chloride and thereto was added five milliliters of 48 percent hydrofluoric acid and 0.5 milliliter of 71 percent perchloric acid. The mixture was stirred vigorously for six hours and then poured into an excess of cold aqueous five percent sodium bicarbonate solution. The methylene chloride layer was separated, dried with anhydrous sodium sulfate, and then poured over a column of 100 grams of Florisil synthetic magnesium silicate. The column was developed with Skellysolve B hexanes and acetone, the fractions containing ten percent acetone were recrystallized from acetone and Skellysolve B hexanes to give pure 6α-methyl-9α,21-difluoro-11β,17α-dihydroxy-4-pregnene-3,20-dione of melting point 210 to 212 degrees centigrade with decomposition and rotation $[\alpha]_D$ plus 89 degrees in acetone.

*Analysis.*—Calcd. for $C_{22}H_{30}O_4F_2$: F, 9.58. Found: F, 9.24.

Following the procedure described in Examples 5 thru 8, but substituting other 6α-alkyl-11β,17α-dihydroxy-21-fluoro-4-pregnene-3,20-diones for the 6α-methyl-11β,17α-dihydroxy - 21 - fluoro-4-pregnene-3,20-dione wherein the alkyl radical is ethyl, propyl, isopropyl, butyl, isobutyl, pentyl, hexyl, or an aryl radical such as phenyl, or the like, results in the corresponding 6α-alkyl-9α,21-difluoro-11β,17α - dihydroxy - 4 - pregnene-3,20-dione wherein the alkyl group will be ethyl, propyl, isopropyl, butyl, isobutyl, pentyl, hexyl, or an aryl such as phenyl, or the like.

Example 9

6α - methyl - 9α,21 - difluoro - 17α - hydroxy - 4-pregnene-3,11,20-trione

Oxidizing in the manner given in Example 4, 6α-methyl-9α,21 - difluoro - 11β,17α - dihydroxy - 4 - pregnene-3,20-dione with chromic anhydride in acetic acid solution produces 6α - methyl - 9α,21 - difluoro - 17α - hydroxy - 4-pregnene-3,11,20-trione.

In a manner similar to Example 9, oxidizing with chromic anhydride in acetic acid solution, other 6α-alkyl-9α,21-difluoro-11β,17α-dihydroxy-4-pregnene - 3,20-dione results in the corresponding 6α-alkyl-9α,21-difluoro-17α-hydroxy-4-pregnene-3,11,20-triones wherein the alkyl group is ethyl, propyl, isopropyl, butyl, isobutyl, pentyl, hexyl, or an aryl, such as phenyl, or the like.

EXAMPLE 10

*6α-methyl-17α,21-dihydroxy-4,9(11)-pregnadiene 3,20-dione 21-acetate*

To a solution of 8.5 grams of 6α-methyl-11β,17α,21-trihydroxy-4-pregnene-3,20-dione 21-acetate (6α-methyl-hydrocortisone 21-acetate) in 42.5 milliliters of pyridine was added 5.63 grams of N-bromoacetamide. After standing at room temperature for a period of fifteen minutes, the reaction solution was cooled to five to ten degrees centigrade and, with shaking, sulfur dioxide gas was passed over the surface until the solution gave no color with acidified starch-iodine paper. During the addition of sulfur dioxide gas, the reaction became warm. The temperature was kept under thirty degrees centigrade by external cooling and by varying the rate of sulfur dioxide addition. Thereafter to the reaction mixture 400 milliliters of ice water was added and the resulting precipitate collected by filtration. This material was recrystallized from acetone-Skellysolve B hexanes to give 5.78 grams of 6α-methyl-17α,21-dihydroxy-4,9(11)-pregnadiene-3,20-dione 21-acetate of melting point 165 to 169 degrees centigrade. The mother liquors were evaporated to a partly crystalline residue which weighed 182 grams. This material was dissolved in methylene chloride and chromatographed on 75 grams of Florisil. The column was eluted with 2000 milliliters of eight percent acetone-92% Skellysolve B and 1000 milliliters of fifteen percent acetone-85% Skellysolve B. The eluant was collected in 200-milliliter fractions. Fractions 3 to 7, were combined, evaporated, and the residue recrystallized from acetone-Skellysolve B hexanes to yield 0.88 gram of 6α-methyl-17α,21-dihydroxy-4,9(11)-pregnadiene-3,20-dione 21-acetate of melting points 169–172 degrees centigrade. The combined yield therefore was 6.66 grams of 82.4 percent. An analytical sample obtained by crystallization from acetone-Skellysolve B hexanes gave 6α-methyl-17α,21-dihydroxy-4,9(11)-pregnadiene-3,20-dione 21-acetate of melting point 175–176 degrees centigrade and rotation $[\alpha]_D$ plus 91 degrees in chloroform.

*Analysis.*—Calcd. for $C_{24}H_{32}O_5$: C, 71.97; H. 8.05 Found: C, 71.75; H, 7.71.

EXAMPLE 11

*6α-methyl-9α-bromo-11β,17α,21 - trihydroxy-4-pregnene-3,20-dione 21-acetate (6α-methyl-9α-bromohydrocortisone 21-acetate)*

To a solution of 5.68 grams of 6α-methyl-17α,21-dihydroxy-4,9(11)-pregnadiene-3,20-dione 21-acetate in 100 milliliters of methylene chloride and 250 milliliters of tertiary butyl alcohol was added a solution of fourteen milliliters of 72 percent perchloric acid in 100 milliliters of water followed by a solution of 2.34 grams of N-bromoacetamide in sixty milliliters of tertiary butyl alcohol. After stirring the reaction mixture for fifteen minutes, a solution of 2.8 grams of sodium sulfite in 140 milliliters of water was added and the reaction mixture was concentrated to a volume of about 500 milliliters under reduced pressure at about fifty degrees centigrade. At this point crystallization started. The concentrate was cooled in an ice bath and while stirring 500 milliliters of water was added. After stirring for a period of one hour, the crystalline product was isolated by filtration, the crystals were washed with water and air-dried to give 6.88 grams (98.9 percent yield) of 6α-methyl-9α-bromo-11β,17α,21-trihydroxy-4-pregnene-3,20-dione 21-acetate (6α-methyl-9α-bromohydrocortisone 21-acetate) of melting point 159 to 161 degrees centigrade (with decomposition). An analytical sample was obtained from dilute acetone of melting point 153–155 and rotation $[\alpha]_D$ plus 148 degrees in chloroform.

*Analysis.*—Calcd. for $C_{24}H_{33}O_6Br$: Br, 16.07. Found: Br, 16.01.

EXAMPLE 12

*6α-methyl-9β,11β-oxido-17α,21-dihydroxy-4-pregnene-3,20-dione 21-acetate*

To a solution of 6.78 grams of 6α-methyl-9α-bromo-11β,17α,21-trihydroxy-4-pregnene-3,20-dione 21-acetate in 175 milliliters of acetone was added 6.78 grams of potassium acetate and the resulting suspension was heated under reflux for a period of seventeen hours. The mixture was then concentrated to approximately sixty milliliters of volume at reduced pressure on the steam bath and thereupon diluted with water and extracted with methylene chloride. The methylene extracts were combined, washed with water, dried over anhydrous sodium sulfate and evaporated. The residue was redissolved in methylene chloride and chromatographed over 200 grams of Florisil anhydrous magnesium silicate. The column was eluted with 1050 milliliters of five percent acetone-95% Skellysolve B hexanes, 1750 milliliters of eight percent acetone-92% Skellysolve B, 3500 milliliters of ten percent acetone-90% Skellysolve B and 350 milliliters of acetone. The eluant was collected in 350-milliliter fractions. Fractions 6–16 contained 4.981 grams (88.1% yield) of totally crystalline material. This material was used without further purification in the next step: An analytical sample of 6α-methyl-9β,11β-oxido-17α,21-dihydroxy-4-pregnene-3,20-dione 21-acetate, obtained by recrystallization of a portion of the peak fraction from acetone-Skellysolve B hexanes, had a melting point of 180 to 182 degrees centigrade and rotation $[\alpha]_D$ of plus 65 degrees in chloroform.

*Analysis.*—Calcd. for $C_{24}H_{32}O_6$: C, 69.20; H, 7.75. Found: C, 69.41; H, 7.93.

EXAMPLE 13

*6α - methyl - 9α - fluoro - 11β,17α,21 - trihydroxy - 4 - pregnene-3,20-dione 21-acetate (6α-methyl-9α-fluorohydrocortisone 21-acetate)*

To approximately 1.3 grams of hydrogen fluoride and 2.3 milliliters of tetrahydrofuran contained in a polyethylene bottle and maintained at minus sixty degrees centigrade a solution of 500 milligrams (0.0012 mole) of 6α - methyl - 9β,11β - oxido - 17α,21 - dihydroxy - 4 - pregnene-3,20-dione 21-acetate (combined chromatographic fractions in two milliliters of methylene chloride was added). The steroid solution was rinsed in with an additional one milliliter of methylene chloride. The light red colored solution was then kept at approximately minus thirty degrees centigrade for one hour and at minus ten degrees for two hours. At the end of this period it was mixed cautiously with an excess of cold sodium bicarbonate solution and the organic material extracted with the aid of additional methylene chloride. The combined extracts were washed with water, dried over anhydrous sodium sulfate and concentrated to approximately 35 milliliters of volume. This solution was chromatogramed over forty milliliters of Florisil anhydrous magnesium silicate. The column was diluted with 400 milliliters of seven percent acetone-93% Skellysolve B hexanes, 500 milliliters of ten percent acetone-90% Skellysolve B, 1000 milliliters of twelve percent acetone-88% Skellysolve B hexanes and 100 milliliters of acetone. The eluant was collected in 100-milliliter fractions. Fractions 11 through 17 were combined and evaporated to give a total of 439 milligrams (84.2%) of crystalline product. Recrystallization from acetone-Skellysolve B gave two crops: 0.23 gram of melting point 218 to 220 degrees centigrade and 0.16 gram of melting point 201 to 208 degrees centigrade. Total yield 74.7%. An analytical sample was obtained from ethyl acetate Skellysolve B hexanes as needles of pure 6α-methyl-9α-fluorohydrocortisone 21-acetate of melting point 219 to 220 degrees centigrade and rotation $[\alpha]_D$ plus 113 degrees in acetone.

*Analysis.*—Calcd. for $C_{24}H_{33}O_6F$: C, 66.03; H, 7.62; F, 4.35. Found: C, 65.69; H, 7.49; F, 4.29.

EXAMPLE 13A

*6α-methyl-9α-fluoro-11β,17α,21-trihydroxy-4-pregnene-3,20-dione 21-acetate (alternate procedure)*

A solution was prepared of 250 milligrams of 6α-methyl - 9β,11β - oxido - 17α,21 - dihydroxy - 4 - pregnene-3,20-dione 21-acetate in five milliliters of methylene chloride and thereto was added one milliliter of 48 percent solution of hydrogen fluoride. The two-phase mixture was stirred for a period of twenty hours, then diluted with fifteen milliliters of methylene chloride and carefully poured into forty milliliters of water containing 3.5 grams of sodium bicarbonate. After shaking to neutralize the excess hydrogen fluoride, the methylene chloride was separated and the water phase was extracted with more methylene chloride. The combined methylene chloride solution (about 75 milliliters) was dried over anhydrous sodium sulfate, diluted with 25 milliliters of ether and chromatographed over twenty grams of Florisil synthetic magnesium silicate. The column was eluted as follows:

TABLE II

| Fraction No. | Solvent |
|---|---|
| 1 (100 milliliters) | Methylene chloride-ether (3:1). |
| 2-6 (40 milliliters each) | Skellysolve B, hexane plus acetone (12%). |
| 7-16 (40 milliliters each) | Skellysolve B, hexane plus acetone (15%). |
| 17-21 (40 milliliters each) | Skellysolve B, hexane plus acetone (20%). |
| 22-26 (40 milliliters each) | Skellysolve B, hexane plus acetone (25%). |
| 27-30 (40 milliliters each) | Skellysolve B, hexane plus acetone (50%). |

Fractions 3 to 13, inclusive, were combined, evaporated and the residue thus obtained recrystallized from ethyl acetate-Skellysolve B hexane and from methylene chloride to give 95 milligrams of 6α-methyl-9α-fluoro-11β,17α,21-trihydroxy-4-pregnene-3,20-dione 21-acetate.

EXAMPLE 14

*6α - methyl - 9α - fluoro - 17α,21 - dihydroxy - 4 - pregnene-3,11,20-trione 21-acetate (6α-methyl-9α-fluorocortisone 21-acetate)*

A solution was prepared containing in one milliliter of acetic acid fifty milligrams of 6α-methyl-9α-fluoro-11β,17α,21-trihydroxy-4-pregnene-3,20-dione 21-acetate, twenty milligrams of chromic anhydride and one drop (approximately fifty milligrams) of water. This mixture was shaken several times at room temperature and allowed to stand for four hours. Thereafter it was poured into ten milliliters of water and refrigerated for twenty hours at about five degrees centigrade. The steroid which separated from the aqueous mixture was collected on filter paper and recrystallized three times from acetone to give 6α-methyl-9α-fluoro-17α,21-dihydroxy-4-pregnene-3,11,20-trione 21-acetate (6α-methyl-9α-fluorocortisone 21-acetate).

EXAMPLE 15

*6α-methyl-9α-fluoro-11β,17α,21-trihydroxy-4-pregnene-3,20-dione (6α-methyl-9α-fluorohydrocortisone)*

Three and one quarter (3.25) grams of 6α-methyl-9α-fluoro - 11β,17α,21 - trihydroxy - 4 - pregnene - 3,20 - dione 21-acetate were dissolved in 325 milliliters of methanol, previously purged of air-oxygen by passing nitrogen through it for ten minutes and thereto was added a solution of 1.63 grams of potassium bicarbonate in thirty milliliters of water, similarly purged of oxygen. The mixture was allowed to stand at room temperature for a period of five hours in a nitrogen atmosphere, thereupon neutralized with 2.14 milliliters of acetic acid in forty milliliters of water. The mixture was concentrated to approximately one third volume at reduced pressure on a sixty-degree-centigrade water-bath. Thereupon 250 milliliters of water was added and the mixture chilled. The crystalline product was collected on a filter, washed with water and dried to give 2.43 grams (83%) of crude 6α-methyl-9α-fluorohydrocortisone. Recrystallization of the crude material from methanol and Skellysolve B gave pure 6α-methyl-9α-fluorohydrocortisone (6α-methyl-9α-fluoro - 11β,17α,21 - trihydroxy - 4 - pregnene - 3,20 - dione) of melting point 228 to 230 degrees centigrade and rotation $[\alpha]_D$ plus 112 degrees in acetone.

*Analysis.*—Calcd. for $C_{22}H_{31}O_5F$: C, 66.98; H, 7.92; F, 4.82. Found: C, 67.20; H, 8.01; F, 5.47.

An additional amount of product (0.24 gram, 8.2%) of 6-methyl-9α-fluorohydrocortisone was obtained by saturating the filtrate with sodium chloride, extracting with methylene chloride, drying the extracts over sodium sulfate, evaporating and recrystallizing the thus-obtained residue from benzene-methanol.

EXAMPLE 16

*6α-methyl-9α-fluoro-11β,17α,21-trihydroxy-4-pregnene-3,20-dione 21-methanesulfonate*

To a solution of 2.13 grams of 6α-methyl-9α-fluoro-11β,17α,21-trihydroxy-4-pregnene-3,20-dione in twenty milliliters of pyridine, cooled to zero degrees centigrade, was added one milliliter of methanesulfonyl chloride. The reaction mixture was stirred at five degrees centigrade for a period of seventeen hours, thereafter poured into a mixture of ice and 200 milliliters of aqueous one Normal hydrochloric acid solution. The resulting methanesulfonate was filtered, washed with water, pressed dry on a porous plate and then further dried at seventy degrees centigrade under vacuum to give 2.49 grams of 6 - methyl - 9α - fluoro - 11β,17α,21 - trihydroxy - 4 - pregnene-3,20-dione 21-methanesulfonate (97.8% yield). Recrystallization of this material from acetone gave pure 6α-methyl-9α-fluorohydrocortisone 21-methanesulfonate of melting point 217 to 218 degrees centigrade with decomposition.

*Analysis.*—Calcd. for $C_{23}H_{33}O_7FS$: C, 58.45; H, 7.04; S, 6.78. Found: C, 59.13; H, 7.06; S, 6.25.

EXAMPLE 17

*6α-methyl-9α-fluoro-11β,17α-dihydroxy-21-iodo-4-pregnene-3,20-dione*

One hundred and fifty (150) milligrams of crude 6α-methyl - 9α - fluoro - 11β,17α,21 - trihydroxy - 4 - pregnene-3,20-dione 21-methanesulfonate was dissolved in fifteen milliliters of acetone and treated with a solution of 0.5 gram of sodium iodide in five milliliters of acetone. The mixture was heated under reflux with stirring for a period of fifteen minutes, the heat then reduced and the mixture concentrated to one third volume at reduced pressure. Ice and water were added and the precipitated product collected on filter, washed with water, and dried over anhydrous sodium sulfate to yield crude 6α-methyl-9α - fluoro - 11β,17α - dihydroxy-21-iodo-4-pregnene-3,20-dione.

EXAMPLE 18

*6α-methyl-9α,21-difluoro-11β,17α-dihydroxy-4-pregnene-3,20-dione*

A solution of 0.1 gram of 6α-methyl-9α-fluoro-11β,17α-dihydroxy-21-iodo-4-pregnene-3,20-dione in fifteen milliliters of acetonitrile was prepared by heating to the boiling point. After cooling to forty degrees centigrade the solution was protected from light, and 0.1 milliliter of fifty percent aqueous solution of silver fluoride was added under stirring. Stirring was continued for one hour at about forty degrees centigrade then another 0.1 milliliter of silver fluoride solution was added. After another hour of stirring, an additional 0.1 milliliter portion of silver fluoride solution was added and heating and stirring continued for a period of two hours. The brownish mixture was thereupon filtered through a bed of Celite diatomaceous earth and the filtrate was evaporated at reduced pressure from a bath at a temperature of fifty degrees centigrade. The brown residue was thoroughly extracted with three ten-milliliter portions of warm methylene chloride, the extracts combined, washed with water, dried over anhydrous sodium sulfate and concentrated to approximately eight milliliter volume. The material was then filtered again, evaporated and three times recrystallized from methanol and water to yield 6α-methyl-9α,21-difluoro-11β,17α-dihydroxy-4-pregnene-3,20-dione of melting point 210 to 212 degrees centigrade with decomposition.

EXAMPLE 19

*6α - methyl - 9α,21 - difluoro - 11β,17α - dihydroxy - 4-pregnene-3,20-dione from 6α-methyl-9α-fluoro-11β,17α, 21-trihydroxy-4-pregnene-3,20-dione 21-methanesulfonate*

A solution of 1.10 grams of 6α-methyl-9α-fluoro-11β, 17α,21-trihydroxy-4-pregnene-3,20-dione 21-methanesulfonate in ten milliliters of dimethylsulfoxide was prepared by heating to approximately 100 degrees centigrade. Thereto was added 550 milligrams of potassium fluoride and the resulting suspension was stirred and heated at a temperature between 100 and 110 degrees centigrade for a period of eighteen hours. The mixture was then cooled, 200 milliliters of water were added and the water phase extracted with methylene chloride and the extracts washed with water, dried over anhydrous sodium sulfate and concentrated to about forty milliliters of volume. This solution was chromatographed over fifty grams of Florisil anhydrous magnesium silicate taking fractions of one hundred milliliters as follows:

TABLE III

| Fraction No. | Solvent |
| --- | --- |
| 1-5 | Skellysolve B hexanes-acetone 90:10. |
| 6-15 | Skellysolve B hexanes-acetone 88:12. |
| 16 | acetone. |

Fractions 7 through 12 were combined and evaporated to give 282 milligrams of residue which was recrystallized from acetone-Skellysolve B hexanes to give 0.2 gram of 6α - methyl-9α,21-difluoro-11β,17α-dihydroxy-4-pregnene-3,20-dione of melting point 210–212 degrees centigrade and a second crop of about thirty milligrams of 6α-methyl - 9α,21 - difluoro - 11β,17α - dihydroxy-4-pregnene-3,20-dione of melting point 205 to 209 degrees centigrade.

*Analysis.*—Calcd. for $C_{22}H_{30}O_4F_2$: C, 66.64; H, 7.62; F, 9.58. Found: C, 66.35; H, 8.07; F, 9.24.

EXAMPLE 20

*6α-methyl-9α,21-difluoro-11β,17α-dihydroxy-1,4-pregnadiene-3,20-dione*

Three 100-milliliter portions of a medium, in 250-milliliter Erlenmeyer flasks, containing one percent glucose, two percent corn steep liquor (sixty percent solids) and tap water, were adjusted to a pH of 4.9. This medium was sterilized for 45 minutes at fifteen pounds per square inch pressure and inoculated with a one to two day growth of *Septomyxa affinis* A. T. C. C. 6737. The Erlenmeyer flask was shaken at room temperature (about 26 to 28 degrees centigrade) for a period of three days. At the end of this period this 300-milliliter volume was used as an inoculum for five liters of the same glucose-corn steep liquor medium which in addition contained five milliliters of an antifoam compound (a mixture of lard oil and octadecanol). The fermentor was placed into the water bath, adjusted to 28 degrees centigrade and the contents stirred (300 R. P. M.) and aerated (0.3 liter air to five liters of beer). After twenty hours of incubation, when a good growth had been developed, one gram of 6α-methyl-9α-21-difluoro-11β,17α-dihydroxy-4-pregnene-3,20-dione plus one-half gram of 3-ketobisnor-4-cholen-22-al, dissolved in sixteen milliliters of dimethylformamide, was added and the incubation carried out at the same temperature (28 degrees centigrade) and aeration for a period of 72 hours (final pH 8.3). The mycelium was filtered off and extracted with three 200-milliliter portions of acetone. The beer was extracted with three one-liter portions of methylene chloride and thereupon the extracts of the beer and acetone were combined, dried over anhydrous sodium sulfate, evaporated and the resulting residue chromatographed over a Florisil anhydrous magnesium silicate column. The column was packed with 100 grams of Florisil and was developed with five 200-milliliter fractions each of methylene chloride, Skellysolve B hexane-acetone mixtures of 9:1, 8:2, 7:3, 1:1, and methanol. The fraction eluted with Skellysolve B acetone (8:2) was twice recrystallized from acetone to give 6α-methyl-9α,21-difluoro-11β,17α-dihydroxy-1,4-pregnadiene-3-20-dione of melting point 262 to 274 degrees centigrade and rotation $[\alpha]_D$ plus 71 degrees in acetone.

In a manner similar to Example 20 using other species of genus Septomyxa under fermentation conditions known in the art, preferably in the presence of a promoting agent such as 3-ketobisnor-4-cholen-22-al, progesterone, 11β,21 - dihydroxy - 1,4,17(20) - pregnatrien - 3 - one, 3-ketobisnor-4-cholenic acid and the like, produces from 6 - methyl - 9α,21-difluoro-11β,17α-dihydroxy-4-pregnene-3,20 - dione the 6 - methyl - 9α,21-difluoro - 11β,17α - dihydroxy-1,4-pregnadiene-3,20-dione. Instead of a species of the genus Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Cucurbitaria, Nocardia, and enzymes of fungi of the family Tuberculariaceae can be used to introduce a $\Delta^1$-bond into 6-methyl-9α-21-difluoro-11β,17α-dihydroxy-4-pregnene-3,20-dione.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:

1. A compound selected from the group consisting of 6 - methyl - 9α,21 - difluoro - 11β,17α - dihydroxy - 4 - pregnene-3-20-dione and 6-methyl-9α,21-difluoro-17α-hydroxy-4-pregnene-3,11,20-trione.

2. 6α - methyl - 9α,21 - difluoro - 11β,17α - dihydroxy - 4-pregnene-3,20-dione.

3. 6α - methyl - 9α,21 - difluoro - 17α - hydroxy - 4 - pregnene-3,11,20-trione.

4. 6α - methyl - 9α - fluoro - 11β,17α - dihydroxy - 21 - iodo-4-pregnene-3,20-dione.

References Cited in the file of this patent

Herz et al.: J. A. C. S. 78, September 20, 1956, pages 4812–4814.

Spero et al.: J. A. C. S. 78, December 5, 1956, pages 6213, 6214.

UNITED STATES PATENT OFFICE
Certificate of Correction

Patent No. 2,867,635 January 6, 1959

Frank H. Lincoln, Jr. et al.

It is hereby certified that error appears in the printed specification of the above numbered patent requiring correction and that the said Letters Patent should read as corrected below.

Column 2, lines 15 to 25, Formula IX should appear as shown below instead of as in the patent—

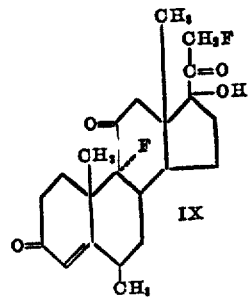

column 7, line 25, for "unually" read —usually—.

Signed and sealed this 14th day of July 1959.

[SEAL]

Attest:
KARL H. AXLINE,
Attesting Officer.

ROBERT C. WATSON,
Commissioner of Patents.